(12) United States Patent
Pan (10) Patent No.: US 11,004,331 B2
(45) Date of Patent: May 11, 2021

(54) INFRARED PROTOCOL-BASED INFRARED CODE TRANSMISSION CIRCUIT, CHIP, REMOTE CONTROL DEVICE AND AIR CONDITIONER

(71) Applicants: GREE ELECTRIC APPLIANCES (WUHAN) CO., LTD, Wuhan (CN); GREE ELECTRIC APPLIANCES, INC. OF ZHUHAI, Zhuhai (CN)

(72) Inventor: Zhenxing Pan, Zhuhai (CN)

(73) Assignees: GREE ELECTRIC APPLIANCES (WUHAN) CO., LTD, Wuhan (CN); GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 16/649,760

(22) PCT Filed: Aug. 16, 2018

(86) PCT No.: PCT/CN2018/100894
§ 371 (c)(1),
(2) Date: Mar. 23, 2020

(87) PCT Pub. No.: WO2019/105069
PCT Pub. Date: Jun. 6, 2019

(65) Prior Publication Data
US 2020/0242918 A1    Jul. 30, 2020

(30) Foreign Application Priority Data
Nov. 30, 2017 (CN) .......................... 201711242114.7

(51) Int. Cl.
G08C 23/04 (2006.01)
H04B 10/116 (2013.01)
H04B 10/50 (2013.01)

(52) U.S. Cl.
CPC ........... *G08C 23/04* (2013.01); *H04B 10/116* (2013.01); *H04B 10/501* (2013.01)

(58) Field of Classification Search
None
See application file for complete search history.

(56) References Cited

U.S. PATENT DOCUMENTS

| | | | | |
|---|---|---|---|---|
| 5,500,691 | A | * | 3/1996 | Martin ................... G08C 17/02 348/734 |
| 2005/0255831 | A1 | * | 11/2005 | Kato ..................... H04W 12/08 455/411 |
| 2014/0208267 | A1 | | 7/2014 | Kim et al. |

FOREIGN PATENT DOCUMENTS

| | | |
|---|---|---|
| CN | 101320516 A | 12/2008 |
| CN | 101944285 A | 1/2011 |

(Continued)

*Primary Examiner* — Darren E Wolf
(74) *Attorney, Agent, or Firm* — Christensen O'Connor Johnson Kindness PLLC (57) ABSTRACT

Provided are an infrared protocol-based infrared code transmission circuit, a chip, a remote control device and an air conditioner. The infrared code transmission circuit includes: a carrier duration control module; a processing module that is configured to configure the carrier duration control module according to a stage type of an infrared code to be transmitted in an infrared protocol, so that the carrier duration control module generates an enabling signal; a carrier generation module that is provided to generate a PWM-type carrier signal according to the stage type of the infrared code to be transmitted in the infrared protocol, and carry out a logic operation on the PWM-type carrier signal and the enabling signal to generate and transmit the infrared code to be transmitted.

19 Claims, 6 Drawing Sheets

(56) References Cited

FOREIGN PATENT DOCUMENTS

| | | |
|---|---|---|
| CN | 101964880 A | 2/2011 |
| CN | 102063785 A | 5/2011 |
| CN | 103186978 A | 7/2013 |
| CN | 103426292 A | 12/2013 |
| CN | 203732734 U | 7/2014 |
| CN | 203733277 U | 7/2014 |
| CN | 104597790 A | 5/2015 |
| CN | 105118225 A | 12/2015 |
| CN | 105261199 A | 1/2016 |
| CN | 105336152 A | 2/2016 |
| CN | 105869383 A | 8/2016 |
| CN | 105934025 A | 9/2016 |
| CN | 106408924 A | 2/2017 |
| CN | 206162860 U | 5/2017 |
| EP | 0 974 944 A2 | 1/2000 |
| JP | 2014-165629 A | 9/2014 |

\* cited by examiner

INFRARED PROTOCOL-BASED INFRARED CODE TRANSMISSION CIRCUIT, CHIP, REMOTE CONTROL DEVICE AND AIR CONDITIONER

REFERENCE APPLICATION

This application is a National Stage of International Application No. PCT/CN2018/100894, filed Aug. 16, 2018 which claims the priority of the Chinese Patent Application No. 201711242114.7, filed on Nov. 30, 2017, and titled "INFRARED PROTOCOL-BASED INFRARED CODE TRANSMISSION CIRCUIT, CHIP, REMOTE CONTROL DEVICE AND AIR CONDITIONER", and the disclosures of which are herein incorporated by reference in its entirety.

TECHNICAL FIELD

The present disclosure relates to the field of communication technology, and in particular to an infrared protocol-based infrared code transmission circuit, a chip, a remote control device and an air conditioner.

BACKGROUND

A lot of remote control devices can control operation of associated intelligent devices based on infrared protocols. For example, a remote controller can transmit an infrared code to an air conditioner to turn off the air conditioner.

The infrared protocol applied in the remote control device has a data format that is relative complex. If the infrared transmission process of the remote control device is simulated totally by a software program via general-purpose input/output (GPIO), the implementation of such software is more complex, and required code amount is larger.

During the implementation of the present disclosure, the inventor found the following problem existing in the prior art that, during the simulation of the transmission process of the infrared code by the software, the processor is constantly in a working state and has higher power consumption.

SUMMARY

An objective of the embodiments of the present disclosure is to provide an infrared protocol-based infrared code transmission circuit, a chip, a remote control device and an air conditioner, thereby solving the technical problem existing in the prior art that the power consumption is higher.

In order to solve the above-mentioned technical problem, the embodiments of the present disclosure provide the technical solutions below.

In a first aspect, the embodiments of the present application provide an infrared protocol-based infrared code transmission circuit. The infrared protocol-based infrared code transmission circuit includes: a carrier duration control module; a processing module, the processing module being connected to the carrier duration control module, and configured to configure the carrier duration control module according to a stage type of an infrared code to be transmitted in an infrared protocol, so that an enabling signal is generated by the carrier duration control module, the enabling signal being configured to determine a carrier generating time point and a carrier duration of the infrared code to be transmitted, and a level type of the enabling signal being constant in a carrier time period and being constant in a non-carrier time period of the infrared code to be transmitted; and a carrier generation module, the carrier generating module being connected to the carrier duration control module, the carrier generating module being configured to generate a PWM-type carrier signal according to the stage type of the infrared code to be transmitted in the infrared protocol, and being configured to perform a logical operation on the PWM-type carrier signal and the enabling signal to generate and transmit the infrared code to be transmitted.

In an embodiment, the carrier generation module is further connected to the processing module, and configured to respond to a configuration input from the processing module and to regulate a cycle of the PWM-type carrier signal and a level width of the PWM-type carrier signal.

In an embodiment, within the carrier time period of the infrared code to be transmitted, the level type of the enabling signal is a high level; and within the non-carrier time period of the infrared code to be transmitted, the level type of the enabling signal is a low level.

In an embodiment, the logic operation is a logic AND operation.

In an embodiment, according to a transmitting sequence, stage types in the infrared protocol include: a stage of head code with carrier, a stage of head code without carrier, a previous data 0 code, a previous data 1 code, a previous half bit end code, an interval level, a post data 0 code, a post data 1 code, a post half bit end code, and an interval level between F codes.

In an embodiment, the processing module is configured to configure the carrier duration control module according to the stage type of the infrared code to be transmitted in the infrared protocol; the processing module configures the carrier duration of the infrared code to be transmitted for the carrier duration control module according to the stage type of the infrared code to be transmitted in the infrared protocol.

In an embodiment, the processing module is further configured to: enter a sleep state after all infrared codes to be transmitted are transmitted.

In an embodiment, the processing module is further configured to: reconfigure the carrier duration control module and the carrier generation module, so that the infrared code transmission circuit serves as a pulse generator.

In an embodiment, the carrier duration control module includes:

a carrier duration controller; a register module, the register module including a plurality of terminals, the register module being connected to the processing module and to the carrier generation module, the register module being configured to receive configurations from the processing module and pre-store a configured value of duration corresponding to the infrared code to be transmitted, and the register module being further configured to configure the carrier generation module; a multiplexer, the multiplexer including multiple data channels, input terminals of the multiplexer being correspondingly connected to the plurality of terminals of the register module via the multiple data channels, and an output terminal of the multiplexer being connected to the carrier duration controller; a state controller, the state controller being connected to the multiplexer and connected to the carrier duration controller, the state controller being configured to select a corresponding data channel of the multiplexer according to the stage type of the infrared code to be transmitted in the infrared protocol, so that the configured value of duration of the infrared code to be transmitted is uploaded into the carrier duration controller; and a data memory, the data memory being respectively connected to a state register and connected to the processing module, the data memory being configured to store a data code to be transmitted, the infrared code to be transmitted including the data code to be transmitted.

In an embodiment, the carrier generation module comprises: a PWM generator, the PWM generator including two signal channels, the two signal channels being configured to receive the configurations input by the register module; a trigger, the trigger including a set terminal, a reset terminal, and a trigger output terminal, the set terminal and the reset terminal of the trigger being respectively connected to the two signal channels of the PWM generator; and an AND gate, the AND-gate including a first input terminal, a second input terminal, and an AND-gate output terminal, the first input terminal of the AND gate being connected to the trigger output terminal of the trigger, the second input terminal of the AND gate being configured to input the enabling signal, the AND-gate output terminal of the AND gate being configured to output the infrared code to be transmitted.

In a second aspect, the embodiments of the present disclosure provide a chip including any one of the infrared protocol-based infrared code transmission circuits above.

In a third aspect, the embodiments of the present disclosure provide a remote control device including any one of the infrared protocol-based infrared code transmission circuits above.

In a fourth aspect, the embodiments of the present disclosure provide an air conditioner including any one of the remote control devices above.

In the infrared protocol-based infrared code transmission circuit provided by the various embodiments of the present disclosure, the processing module configures the carrier duration control module according to the stage type of the infrared code to be transmitted in the infrared protocol, so that the carrier duration control module generates the enabling signal. The enabling signal is configured to determine the carrier generating time point and the carrier duration of the infrared code to be transmitted, and the level type of the enabling signal is constant in the carrier time period and constant in the non-carrier time period of the infrared code to be transmitted. The carrier generation module generates the PWM-type carrier signal according to the stage type of the infrared code in the infrared protocol, and performs logic operation on the PWM-type carrier signal and the enabling signal to form and transmit the infrared code to be transmitted. Therefore, the process of transmitting the infrared code can be completed by the infrared code transmission circuit, and the processing module can enter a sleep state during the transmitting process, thereby reducing power consumption and the difficulty of programming the software.

DETAILED DESCRIPTION OF THE DRAWINGS

One or more embodiments are illustrated by corresponding figures in the accompanying drawings. These exemplary illustrations do not constitute limitations on the embodiments. Elements with the same reference signs in the drawings are denoted as similar elements. Unless otherwise stated, the figures in the drawings do not constitute limitations on scale.

DETAILED DESCRIPTION OF THE EMBODIMENTS

In order to make the objective, technical solutions, and advantages of the present disclosure more apparent and better understood, the present disclosure will be described in more detail with reference to the accompanying drawings and embodiments. It should be understood that the specific embodiments described herein are merely used for interpreting the present disclosure, rather than limiting the present disclosure.

The infrared protocol-based infrared code transmission circuit provided by the embodiments of the disclosure can be applied to a chip. The chip can be combined with other peripheral circuit modules to form a remote control device. The user uses the remote control device to transmit infrared signals matching the infrared protocol to an intelligent device, thereby controlling the operation of the intelligent device. For example, the intelligent device is an air conditioner, and the user remotely controls the air conditioner to stop operating through the remote control device.

Figure 1:
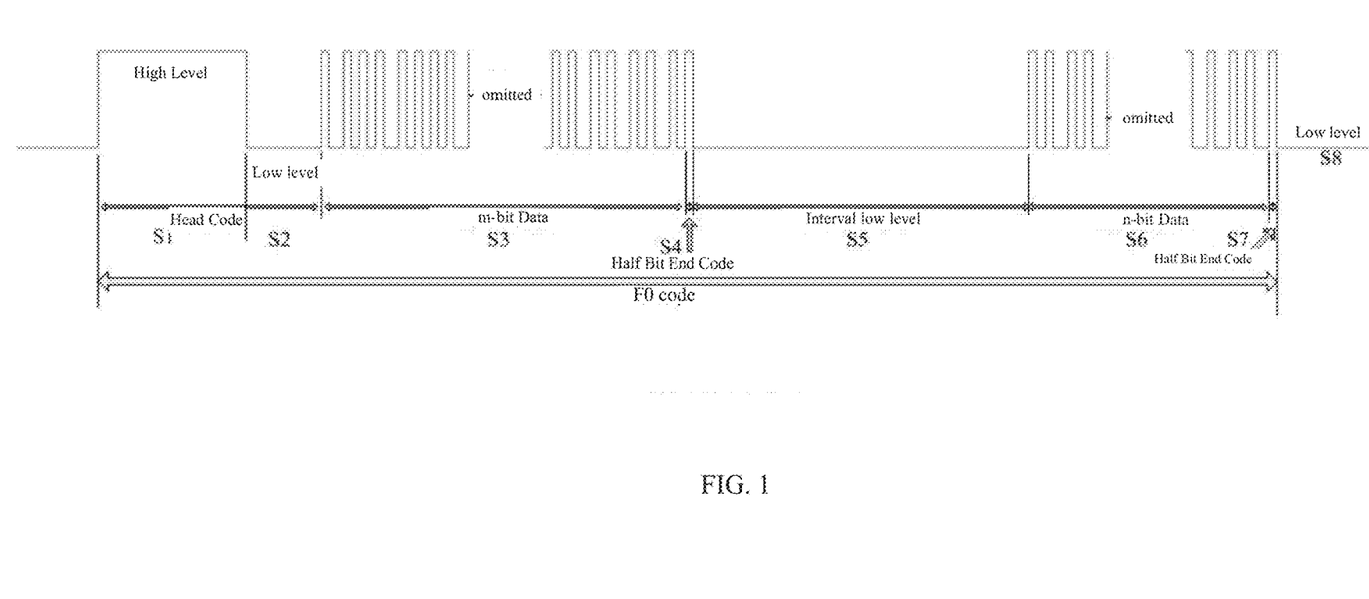
FIG. 1 is a schematic graph showing a waveform of an infrared protocol-based F0 code in a code transmitting state according to an embodiment of the present disclosure.

Referring to FIG. 1, FIG. 1 is a schematic graph showing a waveform of an infrared protocol-based F0 code in a code transmitting state according to an embodiment of the present disclosure. As shown in FIG. 1, according to the transmitting sequence, the infrared protocol includes 8 stages, which respectively are:

S1: a stage of head code with carrier;
S2: a stage of head code without carrier;
S3: previous data code;
S4: previous half bit end code;
S5: interval level;
S6: post data code;
S7: post half bit end code;
S8: interval level between F codes.

As for the previous data code of S3, it can be an n-bit data 0 code or an n-bit data 1 code. Similarly, as for the post data code of S6, it can be an n-bit data 0 code or an n-bit data 1 code.

Therefore, according to the transmitting sequence, the stage types of the infrared protocol include 10 stage types, which respectively are: a stage of head code with carrier, a stage of head code without carrier, previous data 0 code, previous data 1 code, previous half bit end code, interval level, post data 0 code, post data 1 code, post half bit end code, and interval level between F codes.

In some embodiments, some of FM codes can only include a few of the above stages. For example, as shown in FIG. 2, the FM code only includes the stages of S1, S2, S3, and S4.

Figure 2:
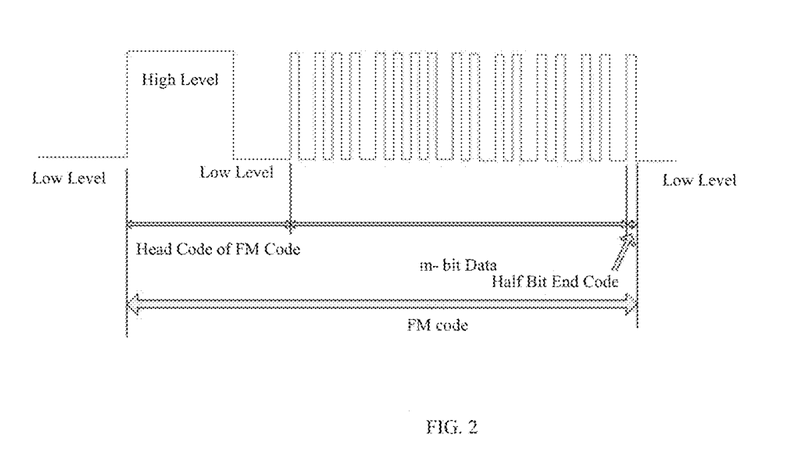
FIG. 2 is a schematic graph showing a waveform of an infrared protocol-based FM code in a code transmitting state according to an embodiment of the present disclosure.
Figure 3:
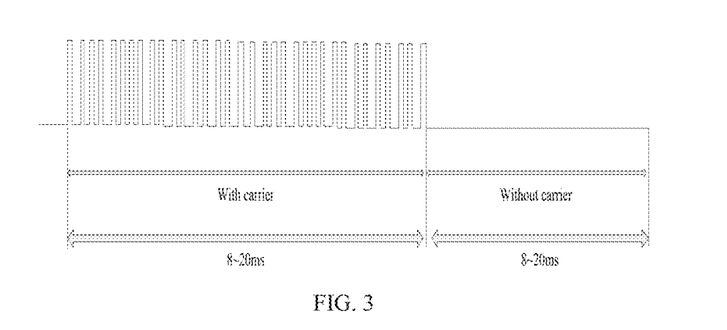
FIG. 3 is a schematic graph showing a waveform of a head code according to an embodiment of the present disclosure.

It should be noted that, in FIG. 1 or FIG. 2, a first high level represents that infrared carrier signals are output in the time period in which the first high level lasts, and a first low level represents that no infrared carrier signals are output in the time period in which the first low level lasts. For example, referring to FIG. 3, FIG. 3 is a schematic graph showing a waveform of a head code according to an embodiment of the present disclosure. As shown in FIG. 3, the head code with infrared carrier signal is a square wave signal with a preset duration, and the head code without infrared carrier signal is a second low level signal with a preset duration. However, as shown in FIG. 1 or FIG. 2, the head code is constantly a second high level in the time period in which the first high level lasts. Indeed, as described above, the second high level of the head code in the time period in which the first high level lasts merely represents that the infrared carrier signals are output in the time period in which the first high level lasts, and the second high level of the head code does not represent that, during transmitting the code, the output is constantly the second high level in the time period in which the first high level lasts. The actual waveform graph is shown in FIG. 3. The reason why the code transmitting process is represented by using the waveform shown in FIG. 1 or FIG. 2 is the facilitation for illustration, which should be understood by the skilled in the art.

Figure 4:
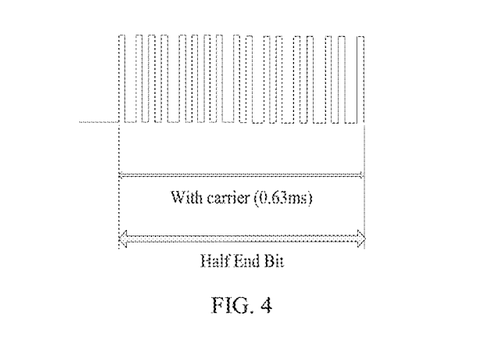
FIG. 4 is a schematic graph showing a waveform of a half end bit according to an embodiment of the present disclosure.

Similarly, the embodiments of the present disclosure further provide a waveform graph of a half end bit, as shown in FIG. 4. The difference between FIG. 4 and e FIG. 1 or FIG. 2 will not repeatedly described herein.

Figure 5:
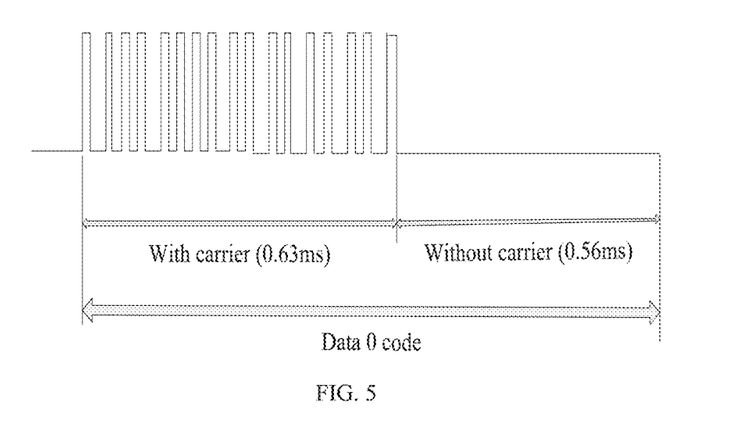
FIG. 5 is a schematic graph showing a waveform of a data 0 code according to an embodiment of the present disclosure.
Figure 6:
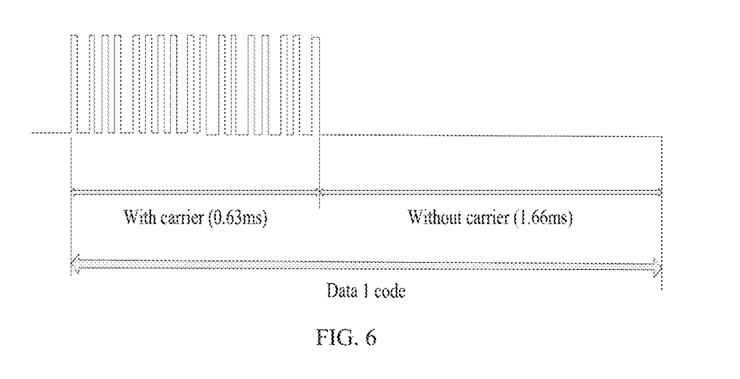
FIG. 6 is a schematic graph showing a waveform of a data 1 code according to an embodiment of the present disclosure.

The embodiments of the present disclosure further provide a waveform graph of a data 0 code and a waveform graph of a data 1 code. Please refer to FIG. 5 and FIG. 6. In FIG. 5, the time period of the data 0 code with infrared carrier signal is 0.63 ms, and the time period of the data 0 code without infrared carrier signal is 0.56 ms. In FIG. 6, the time period of the data 1 code with infrared carrier signal is 0.63 ms, and the period of the data 1 code without infrared carrier signal is 1.66 ms. In practical operation, the intelligent device can identify the data 0 code or the data 1 code by identifying the time period of the code without infrared carrier signal.

As described above, in the conventional technologies, the transmission of infrared codes is simulated by software, and the power consumption is higher. Therefore, the embodiments of the present disclosure provide an infrared protocol-based infrared code transmission circuit, in order to at least solve this technical problem.

Figure 7:
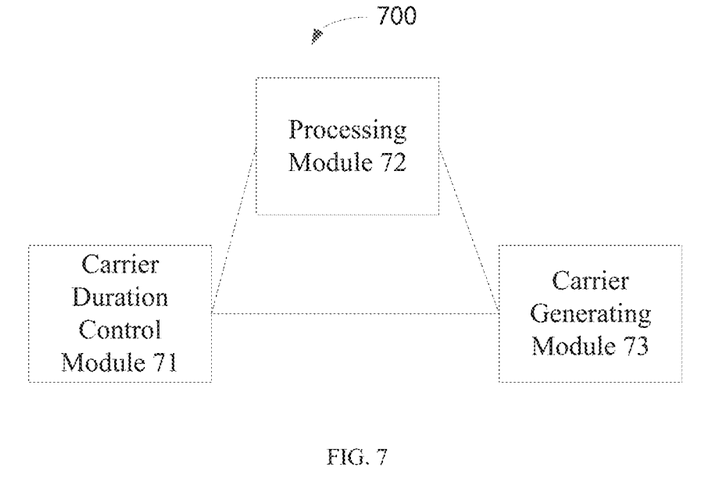
FIG. 7 is a schematic diagram illustrating an infrared protocol-based infrared code transmission circuit according to an embodiment of the present disclosure.

Referring to FIG. 7, FIG. 7 is a schematic structural diagram illustrating the infrared protocol-based infrared code transmission circuit according to an embodiment of the present disclosure. As shown in FIG. 7, the infrared code transmission circuit 700 includes a carrier duration control module 71, a processing module 72, and a carrier generation module 73. The processing module 72 is connected to the carrier duration control module 71, and the carrier generation module 73 is connected to the carrier duration control module 71. The carrier generation module 73 can generate a PWM wave from 20 KHz to 60 KHz.

The processing module 72 is configured to configure the carrier duration control module 71 according to the stage type of the infrared code to be transmitted in the infrared protocol, so that the carrier duration control module 71 generates an enabling signal. The enabling signal is configured to determine a carrier generating time point and a carrier duration of the infrared code to be transmitted, and the level type of the enabling signal is constant in the carrier time period and constant in the non-carrier time period of the infrared code to be transmitted.

For example, when the infrared code to be transmitted is the head code, and the stage type of the head code in the infrared protocol is the stage of the head code with carrier, thus the processing module 72 configures the carrier duration of the infrared code to be transmitted for the carrier duration control module 71, so that, at the starting time point of the stage of the head code with carrier, the carrier duration control module 71 transmits the enabling signal, and the enabling signal has the level type of the high level and the duration from 8 ms to 20 ms. Further, when the infrared code to be transmitted is the head code, and the stage type of the head code in the infrared protocol is the stage of the head code without carrier, the processing module 72 configures the carrier duration control module 71, so that, at the starting time point of the stage of the head code without carrier, the carrier duration control module 71 transmits the enabling signal, and the enabling signal has the level type of the low level and the duration from 8 ms to 20 ms.

For another example, when the infrared code to be transmitted is the previous data code, and the stage type of the previous data code in the infrared protocol is the stage of the data 0 code, thus the processing module 72 configures the carrier duration control module 71, so that, at the starting time point of the data 0 code, the carrier duration control module 71 transmits the enabling signal, and the enabling signal has the level type of the high level and the duration of 0.63 ms. In the non-carrier cycle, the enabling signal is a low level.

Further, the carrier generation module 73 is configured to generate a PWM-type carrier signal according to the stage type of the infrared code to be transmitted in the infrared protocol, and perform a logic operation on the PWM-type carrier signal and the enabling signal to generate and transmit the infrared code to be transmitted.

For example, when the infrared code to be transmitted is the head code, the stage type of the head code in the infrared protocol is the stage of the head code with carrier, and a logic AND operation is performed on the enabling signal of high level and the PWM-type carrier signal, thus, in the corresponding duration of the enabling signal of high level, the generated infrared code to be transmitted is the same as the PWM-type carrier signal. When a logic AND operation is performed on the enabling signal of low level and the PWM-type carrier signal, in the corresponding duration of the enabling signal of low level, the generated infrared code to be transmitted is a low level.

In some embodiments, the level type of the enabling signal and the logic operation can be adjusted according to the infrared protocol. For example, within the carrier time period of the infrared code to be transmitted, the level type of the enabling signal is the high level. Within the non-carrier time period of the infrared code to be transmitted, the level type of the enabling signal is the low level. The logic operation is a logic AND operation.

In some embodiments, the carrier generation module 73 is further connected to the processing module 72, and is configured to respond to the configuration input from the processing module 72 and regulate a cycle and a level width of the PWM-type carrier signal. Wherein, the level width includes the width of the high level and the width of the low level. In practical, a lot of advantages can be achieved by regulating the cycle and the level width of the carrier signal. For example, the power consumption can be reduced by a configuration of reducing the cycle and reducing the level width of the carrier signal.

In some embodiments, the processing module 72 is further configured to enter a sleep state after all the infrared codes to be transmitted are transmitted. Therefore, the power consumption can be reduced as much as possible, which is critical for the remote control device.

In some embodiments, since the infrared code transmission circuit provided by the embodiments of the present disclosure can achieve an output of a square wave signal, the infrared code transmission circuit can be configured to perform other functions when the infrared code transmission circuit is in an idle state. For example, when the infrared transmitting function is not needed, the processing module 72 is further configured to reconfigure the carrier duration control module 71 and the carrier generation module 73, so that the infrared code transmission circuit serves as a pulse generator. The pulse generator can be a counter, a timer, and the like.

In order to illustrate the infrared code transmission circuit provided by the embodiments of the present disclosure in detail, the working principle of the infrared code transmission circuit will be illustrated in detail with reference to the embodiments in combination with FIG. 8, FIG. 9, and FIG. 10 of the present disclosure.

The hardware structure of the infrared code transmission circuit will be further described in detail with reference to the embodiments of the present disclosure hereafter. It should be noted that the illustration of the hardware architecture of the infrared code transmission circuit is not intended to limit the protection scope of the present disclosure, but for the purpose of understanding the embodiments of the present disclosure.

Figure 8:
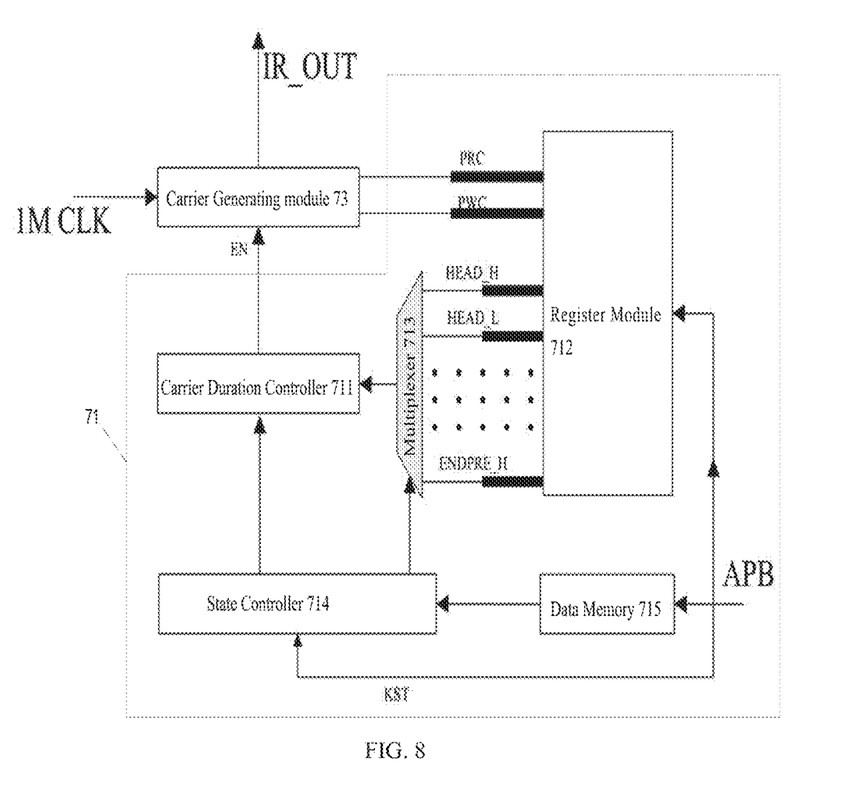
FIG. 8 is a schematic diagram illustrating a circuit structure of a carrier duration control module according to an embodiment of the present disclosure.

As shown in FIG. 8, the carrier duration control module 71 includes a carrier duration controller 711, a register module 712, a multiplexer 713, a state controller 714, and a data memory 715.

Figure 9:
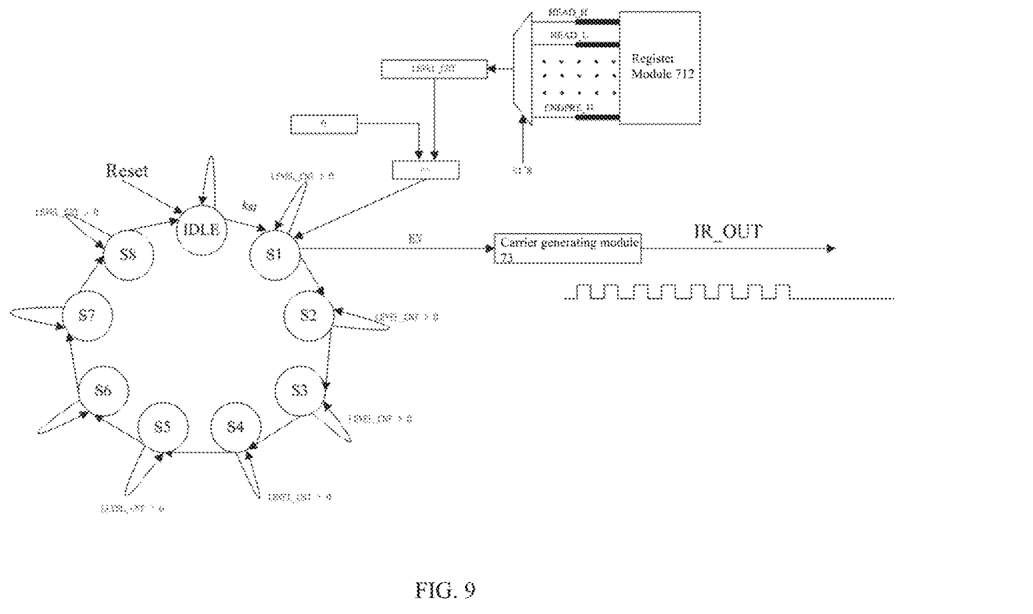
FIG. 9 is a schematic diagram illustrating an infrared protocol-based infrared code transmission circuit in a code transmitting state according to an embodiment of the present disclosure.

Referring to FIG. 8 and FIG. 9, when the carrier duration controller 711 transmits the corresponding code bits, the corresponding configured duration value from the register module 712, such as HEAD_H, HEAD_L, DAT0_H, DAT0_L ENDPOS_H, or the like, is uploaded into the register LEVEL_CNT, and starting from the duration value, the register LEVEL_CNT counts down to zero via the CLOCK having a frequency of 1 MHz. In the duration, the enabling terminal of the carrier duration control module 71 is driven to be 0 or 1; and then jump to a next stage, thereby generating an enabling signal of the carrier generation module 73, where the enabling signal has the corresponding duration.

The register module 712 includes a plurality of terminals. The register module 712 is connected to the processing module 72 and connected to the carrier generation module 73. The register module 712 is configured to receive the configurations from the processing module 72, and pre-store the configured duration value corresponding to the duration of the infrared code to be transmitted. The register module 712 is further configured to configure the carrier generation module 73.

The multiplexer 713 includes multiple data channels. The input terminals of the multiplexer 713 are correspondingly connected to the plurality of terminals of the register module 712 via multiple data channels, and the output terminal of the multiplexer 713 is connected to the carrier duration controller 711.

As shown in FIG. 8, the register module 712 includes several registers. The processing module 72 can write values to be configured into the corresponding register via an APB interface. The level type and the level width corresponding to the infrared code to be transmitted of each stage type can be respectively configured by the corresponding register. They are specifically configured as follows:

as for the head code, the duration of the stage of the head code with carrier and the duration of the stage of the head code without carrier can be respectively configured by the register HEAD_H and the register HEAD_L;

as for the data 0 code, the data 0 code includes a portion with carrier and a portion without carrier, and the duration of the portion with carrier and the duration of the portion without carrier can be respectively configured by the register DAT0_H and the register DAT0_L;

as for the data 1 code, the data 1 code includes a portion with carrier and a portion without carrier, and the duration of the portion with carrier and the duration of the portion without carrier can be respectively configured by the register DAT1_H and the register DAT1_L;

as for the previous half bit end code, the previous half bit end code only has a portion with carrier, and the duration of the previous half bit end code can be configured by the register ENDPRE_H;

as for the post half bit end code, the post half bit end code only has a portion with carrier, and the duration of the post half bit end code can be configured by the register ENDPOS_H;

as for the interval level, the interval level only has a portion without carrier, and the interval level can be configured by the register INTERVAL;

as for the bit number of previous data code, the previous data code includes an n-bit data 0 code or an n-bit data 1 code, wherein n is a bit number of the previous data code, and the value of n can be configured by the register PRE_BITS;

as for the bit number of post data code, the post data code includes an m-bit data 0 code or an m-bit data 1 code, wherein m is the bit number of the post data code, and the value of m can be configured by the register POS_BITS;

as for the interval level between F codes, the interval low level between two F codes is configured by FN_INTERVAL.

The register PRC is configured to configure a cycle of the PWM-type carrier signal generated by the carrier generation module 73, and the register PWC is configured to configure the width of the high level.

As for the above each of the stage types of the infrared code, each stage type of the infrared code has a separate enabling control bit. When this enabling control bit is 0, the corresponding stage will be skipped. The specific description is as flows:

EN_HEADH is the enabling control bit for the stage S1 of the head code with carrier;

EN_HEADL is the enabling control bit for the stage S2 of the head code without carrier;

EN_PREDAT is the enabling control bit for the stage S3 of the previous data code;

EN_ENDPRE is the enabling control bit for the stage S4 of the previous half bit end code;

EN_INTERVAL is the enabling control bit for the stage S5 of the interval level;

EN_POSDAT is the enabling control bit for the stage S6 of the post data code;

EN_ENDPOS is the enabling control bit for the stage S7 of the post half bit end code;

EN_FNINTER is the enabling control bit for the stage S8 of the interval level between F codes.

Referring to FIG. 2 again, the FM code shown in FIG. 2 can be considered as an F0 code in a special case, that is, the F0 code has only the stages of S1, S2, S3, and S4. That is, the enabling control bits should be configured as flows:

EN_HEADH=1, EN_HEADL=1, EN_PREDAT=1, EN_ENDPRE=1, EN_INTERVAL=0, EN_POSDAT=0, EN_ENDPOS=0, and EN_FNINTER=0.

The state controller 714 is connected to the multiplexer 713 and connected to the carrier duration controller 711, and the state controller 714 is configured to select a corresponding data channel of the multiplexer 713 according to the stage type of the infrared code in the infrared protocol, so that the configured value of duration of the infrared code to be transmitted is uploaded into the carrier duration controller 711.

The data memory 715 is respectively connected to the state controller 714 and connected to the processing module 72. The data memory 715 is configured to store the data code to be transmitted, wherein the infrared code to be transmitted includes the data code to be transmitted. Before the infrared code transmission circuit starts, first, the processing module 72 combines date of the previous data bits and the post data bits to be transmitted to form several 32-bit data, then the 32-bit data are written into this data memory 715 in sequence. In the transmission process (i.e. the process of transmitting the previous data bits and the post data bits), the state controller 714 can automatically read the data bits stream in sequence from the data memory 715, and then control the carrier duration controller 711 to generate a corresponding modulated wave. The data memory 715 can be an FIFO memory.

Figure 10:
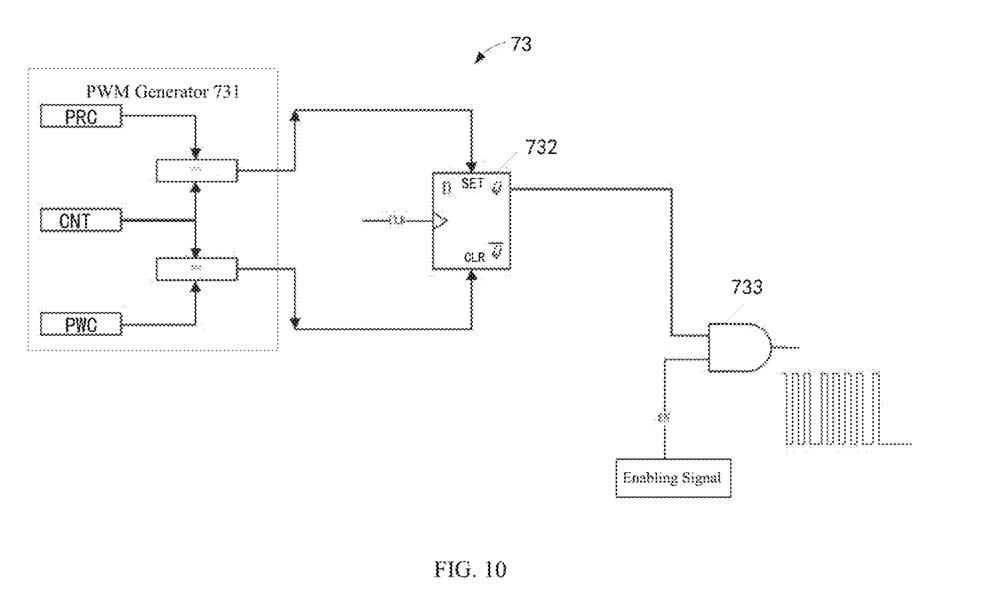
FIG. 10 is a schematic diagram illustrating a circuit structure of a carrier generation module according to an embodiment of the present disclosure.

Referring to FIG. 10, the carrier generation module 73 includes a PWM generator 731, a trigger 732, and an AND gate 733.

The PWM generator 731 includes two signal channels configured to receive the configurations input by the register module 712, for example, to receive the configurations from the register PRC and the configuration from the register PWC.

The trigger 732 includes a set terminal, a reset terminal, and a trigger output terminal. The set terminal and the reset terminal of the trigger 732 are respectively connected to the two signal channels of the PWM generator 731.

The AND-gate 733 includes a first input terminal, a second input terminal, and an AND-gate output terminal. The first input terminal of the AND gate 733 is connected to the trigger output terminal of the trigger 732. The second input terminal of the AND gate 733 is configured to input the enabling signal. The AND-gate output terminal of the AND gate 733 is configured to output the infrared code to be transmitted.

The working principle of the infrared code transmission circuit will be described in detail with reference to the embodiments in combination with FIGS. 8 to 10 of the present disclosure hereafter. It should be noted that the infrared code transmission circuit can operate in one of three modes: 1. automatically code transmitting mode; 2. manually code transmitting mode; and 3. general timer mode.

A. The automatically code transmitting mode

In the automatically code transmitting mode, the infrared code transmission circuit can automatically complete code transmitting steps of each of the above stages in sequence. In the process of transmitting the infrared code, as long as the FIFO memory is not full, data of the next F code can be written into the FIFO memory and be transmitted continuously.

In the stage S3 or the stage S6, the data in the FIFO memory can be read by the hardware one by one, and the data bits can be removed one by one from the highest bit or from the lowest bit (configurable). When the bit is 0, the infrared code transmission circuit can automatically transmit the waveform of the data 0 code. When the bit is 1, the infrared code transmission circuit can automatically transmit the waveform of the data 1 code.

The process of transmitting the infrared code by the infrared code transmission circuit is as follows.

1. The corresponding durations, such as HEAD_H, HEAD_L, DAT0_H, DAT0_L, ENDPOS_H, and the like, are configured for the register module 712 by the processing module 72 via the APB bus.

2. The bit number (PRE_BITS) of previous data code and the bit number (POS_BITS) of post data code are configured by the processing module 72 via the APB bus.

3. The data to be transmitted are combined to form several 32-bit data, and the 32-bit data are written into the FIFO memory.

4. When software writes the transmission trigger bit KST of the register, the infrared code transmission circuit can automatically transmit the head code, the previous data code, the previous half bit end code, the interval level, the post data code, and the post half bit end code in sequence. After the transmission of each of the above stages (the head code, the previous data code, the previous half bit end code, the interval level, the post data code, and the post half bit end code) is completely, corresponding interrupts and flag bits are generated.

5. When the processing module 72 is idle, it can execute other tasks or sleep. When the transmission of the infrared code is completed, an interrupt signal indicating the accomplishment of transmission is sent to notify or wake up the processing module 72.

6. During transmitting the next infrared code, the above steps are repeated.

B. The manually code transmitting mode

Firstly, during transmitting the infrared code, the waveform of the infrared code shown in FIG. 1 can be divided into separate modulated PWM waves, as shown in FIGS. 3, 4, 5, and 6.

During transmitting the infrared code, the software divides the infrared code into the above-mentioned separate code bits (i.e. the head code, the data 0 code, the data 1 code, and the half bit end code). Before transmitting each wave (code), the software needs configure the duration of the code with carrier and the duration of the code without carrier respectively via DAT0_H and DAT0_L, and inside the infrared code transmission circuit, HEAD_H and HEAD_L are respectively used as the BUFFER register for DAT0_H and the BUFFER register for DAT0_L automatically.

Therefore, before transmitting the first infrared code, firstly the first configured value of duration is written into DAT0_H and DAT0_L, and the second configured value of duration is subsequently written into DAT0_H and DAT0_L. After written, the data are stored at locations shown in FIG. 11.

Figure 11:
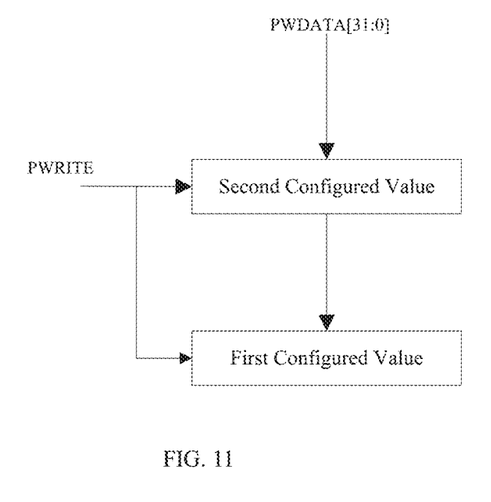
FIG. 11 is a schematic diagram illustrating a configuring process in a manually code transmitting mode according to an embodiment of the present disclosure.

Secondly, the software writes the trigger bit to trigger the infrared code transmission circuit to transmit the infrared wave. After the waveform of the first code bit is transmitted, the infrared code transmission circuit can automatically transmit the second infrared wave according to the second configured value of duration, and simultaneously the infrared code transmission circuit generates an interrupt signal to tell the processing module 72 to write the configured value of duration of the next code bit into DAT0_H and DAT0_L.

Repeat the above process of transmitting code bit till all the code bits are transmitted.

After all code bits are transmitted, the software disables the enabling terminal of the infrared code transmission circuit.

C. The general timer mode

In some occasions where the infrared code need not to be transmitted, the infrared code transmission circuit can serve as a general 16-bit timer or a PWM generator, and the waveform is output via the pin IR_OUT. In these cases, the two 8-bit registers PRC and PWC can be combined to form a 16-bit timer, and the HEAD_H is used to configure a counting cycle, and the HEAD_L is used to configure a pulse width.

Lastly, it should be noted that the above embodiments are only used to illustrate the technical solutions of the present disclosure, but not intended to limit the present disclosure. In the above same embodiments or different embodiments, the technical features can also be combined, and the steps can be implemented in arbitrary order. Also there are many other variations for different aspects described above of the disclosure, which are not provided in detail herein for simplicity. Although the present disclosure has been described in detail with reference to the foregoing embodiments, those skilled in the art should understand that modifications for the technical solutions described in the foregoing embodiments or equivalent replacements for some of the technical features can be made; and these modifications or replacements do not make the essence of the corresponding technical solutions depart from the scope of the technical solution of each of the embodiments of the present disclosure.

What is claimed is:

1. An infrared protocol-based infrared code transmission circuit, comprising:
    a carrier duration control module;
    circuitry for providing a processing module, the processing module being connected to the carrier duration control module, and configured to configure the carrier duration control module according to a stage type of an infrared code to be transmitted in an infrared protocol, so that an enabling signal is generated by the carrier duration control module, the enabling signal being configured to determine a carrier generating time point and a carrier duration of the infrared code to be transmitted, and a level type of the enabling signal being constant in a carrier time period and being constant in a non-carrier time period of the infrared code to be transmitted; and
    circuitry for providing a carrier generation module, the carrier generating module being connected to the carrier duration control module, the carrier generating module being configured to generate a PWM-type carrier signal according to the stage type of the infrared code to be transmitted in the infrared protocol, and being configured to perform a logical operation on the PWM-type carrier signal and the enabling signal to generate and transmit the infrared code to be transmitted;
    wherein the carrier duration control module comprises:
        a carrier duration controller;
        a register module, the register module comprising a plurality of terminals, the register module being connected to the processing module and to the carrier generation module, the register module being configured to receive configurations from the processing module and pre-store a configured value of duration corresponding to the infrared code to be transmitted, and the register module being further configured to configure the carrier generation module;
        a multiplexer, the multiplexer comprising multiple data channels, input terminals of the multiplexer being correspondingly connected to the plurality of terminals of the register module via the multiple data channels, and an output terminal of the multiplexer being connected to the carrier duration controller;
        a state controller, the state controller being connected to the multiplexer and connected to the carrier duration controller, the state controller being configured to select a corresponding data channel of the multiplexer according to the stage type of the infrared code to be transmitted in the infrared protocol, so that the configured value of duration of the infrared code to be transmitted is uploaded into the carrier duration controller; and
        a data memory, the data memory being respectively connected to a state register and connected to the processing module, the data memory being configured to store a data code to be transmitted, the infrared code to be transmitted comprising the data code to be transmitted.

2. The infrared protocol-based infrared code transmission circuit of claim 1, wherein the carrier generation module is further connected to the processing module, and configured to respond to a configuration input from the processing module and to regulate a cycle of the PWM-type carrier signal and a level width of the PWM-type carrier signal.

3. The infrared protocol-based infrared code transmission circuit of claim 1, wherein
    within the carrier time period of the infrared code to be transmitted, the level type of the enabling signal is a high level; and
    within the non-carrier time period of the infrared code to be transmitted, the level type of the enabling signal is a low level.

4. The infrared protocol-based infrared code transmission circuit of claim 1, wherein the logic operation is a logic AND operation.

5. The infrared protocol-based infrared code transmission circuit of claim 1, wherein, according to a transmitting sequence, stage types in the infrared protocol comprise: a stage of head code with carrier, a stage of head code without carrier, a previous data 0 code, a previous data 1 code, a previous half bit end code, an interval level, a post data 0 code, a post data 1 code, a post half bit end code, and an interval level between F codes.

6. The infrared protocol-based infrared code transmission circuit of claim 1, wherein the processing module is configured to configure the carrier duration control module according to the stage type of the infrared code to be transmitted in the infrared protocol;

the processing module configures the carrier duration of the infrared code to be transmitted for the carrier duration control module according to the stage type of the infrared code to be transmitted in the infrared protocol.

7. The infrared protocol-based infrared code transmission circuit of claim 1, wherein the processing module is further configured to enter a sleep state after all infrared codes to be transmitted are transmitted.

8. The infrared protocol-based infrared code transmission circuit of claim 1, wherein the processing module is further configured to reconfigure the carrier duration control module and the carrier generation module, so that the infrared code transmission circuit serves as a pulse generator.

9. The infrared protocol-based infrared code transmission circuit of claim 1, wherein the carrier generation module comprises:
  a PWM generator, the PWM generator comprising two signal channels, the two signal channels being configured to receive the configurations input by the register module;
  a trigger, the trigger comprising a set terminal, a reset terminal, and a trigger output terminal, the set terminal and the reset terminal of the trigger being respectively connected to the two signal channels of the PWM generator; and
  an AND gate, the AND gate comprising a first input terminal, a second input terminal, and an AND-gate output terminal, the first input terminal of the AND gate being connected to the trigger output terminal of the trigger, the second input terminal of the AND gate being configured to input the enabling signal, the AND-gate output terminal of the AND gate being configured to output the infrared code to be transmitted.

10. A chip, comprising the infrared protocol-based infrared code transmission circuit of claim 1.

11. A remote control device, comprising the infrared protocol-based infrared code transmission circuit of claim 1.

12. An air conditioner, comprising the remote control device of claim 11.

13. The infrared protocol-based infrared code transmission circuit of claim 1, wherein before the infrared code transmission circuit starts, first, the processing module is configured to combine date of previous data bits and post data bits to be transmitted to form several 32-bit data, then the 32-bit data are written into the data memory in sequence;
  in a process of transmitting the previous data bits and the post data bits, the state controller is configured to automatically read a data bits stream in sequence from the data memory and then control the carrier duration controller to generate a corresponding modulated wave.

14. The infrared protocol-based infrared code transmission circuit of claim 1, wherein the register module comprises several registers, and the processing module is capable of writing values to be configured into corresponding registers via an APB interface.

15. The infrared protocol-based infrared code transmission circuit of claim 14, wherein a level type and a level width corresponding to the infrared code to be transmitted of each stage type are respectively configured by the corresponding registers.

16. The infrared protocol-based infrared code transmission circuit of claim 8, wherein the pulse generator is a counter or a timer.

17. The infrared protocol-based infrared code transmission circuit of claim 1, wherein the infrared code to be transmitted is a head code; a stage type of the head code in the infrared protocol is a stage of the head code with carrier; and the enabling signal has the level type of high level and a duration from 8 ms to 20 ms.

18. The infrared protocol-based infrared code transmission circuit of claim 1, wherein the infrared code to be transmitted is a head code; a stage type of the head code in the infrared protocol is a stage of the head code without carrier; and the enabling signal has the level type of low level and a duration from 8 ms to 20 ms.

19. The infrared protocol-based infrared code transmission circuit of claim 1, wherein the infrared code to be transmitted is a previous data code; a stage type of head code in the infrared protocol is a stage of a data 0 code; and the enabling signal has the level type of high level and a duration of 0.63 ms.

\* \* \* \* \*